(12) United States Patent
Chang

(10) Patent No.: US 7,631,674 B2
(45) Date of Patent: Dec. 15, 2009

(54) WORKING MACHINE HAVING DISTANCE ADJUSTMENT FUNCTION

(76) Inventor: Pin-Feng Chang, 36, Alley 45, Lane 884, Sanfeng Rd., Fengyuan City, Taichung County (TW)

( * ) Notice: Subject to any disclaimer, the term of this patent is extended or adjusted under 35 U.S.C. 154(b) by 574 days.

(21) Appl. No.: 11/504,812

(22) Filed: Aug. 15, 2006

(65) Prior Publication Data

US 2007/0277662 A1    Dec. 6, 2007

(30) Foreign Application Priority Data

Jan. 6, 2006    (TW) .............................. 95200373 U

(51) Int. Cl.
*B25H 1/00* (2006.01)
*B23B 47/18* (2006.01)
(52) U.S. Cl. ...................... 144/286.5; 408/103; 408/136
(58) Field of Classification Search .............. 144/286.1, 144/286.5, 287; 408/103, 108, 109, 129, 408/136, 234; 83/469, 471, 471.1, 474, 477, 83/477.1

See application file for complete search history.

(56) References Cited

U.S. PATENT DOCUMENTS

| 6,189,429 | B1 * | 2/2001 | Liu .............................. 83/477 |
| 6,581,655 | B2 * | 6/2003 | Huang ......................... 144/287 |
| 6,857,456 | B2 * | 2/2005 | Manning .................. 144/286.5 |
| 7,537,420 | B2 * | 5/2009 | Chang ......................... 408/103 |

* cited by examiner

*Primary Examiner*—Shelley Self
(74) *Attorney, Agent, or Firm*—Alan Kamrath; Kamrath & Associates PA

(57) ABSTRACT

A working machine includes a main frame, a work table, a plurality of working tools, and a distance adjustment device. The distance adjustment device includes two guide tracks, two positioning members, and an adjustment unit. Thus, the adjustment unit can be used to adjust the position of the workpiece relative to the work table to adjust the working distance of the workpiece, thereby facilitating a user working the workpiece. In addition, the locking portion of each of the positioning rods is locked in the positioning holes of the respective positioning member closely, so that each of the fixing seats is fixed on the respective positioning member to position the adjustment unit so as to adjust the working distance of the workpiece exactly.

19 Claims, 7 Drawing Sheets

US 7,631,674 B2

WORKING MACHINE HAVING DISTANCE ADJUSTMENT FUNCTION

BACKGROUND OF THE INVENTION

1. Field of the Invention

The present invention relates to a working machine and, more particularly, to a working machine, such as a drilling machine for working a workpiece, such as a wood material.

2. Description of the Related Art

A conventional working machine in accordance with the prior art shown in FIG. 7 is used for working a workpiece 6, such as a wood material and comprises a main frame 1, a work table 2 mounted on the main frame 1 for placing the workpiece 6, a plurality of working tools 3 movably mounted in the main frame 1 and movable to protrude outwardly from the work table 2 to work the workpiece 6, two cantilevers 4 secured on the main frame 1, and a clamping device 5 mounted between the cantilevers 4 to clamp the workpiece 6. The clamping device 5 includes a fixing seat 501 mounted between the cantilevers 4 and two cylinders 502 mounted on the fixing seat 501 to press the workpiece 6 on the work table 2. However, the working distance of the workpiece 6 worked by the working tools 3 is fixed and cannot be adjusted, so that when the working distance of the workpiece 6 is to be changed, the user has to draw a line on the workpiece 6 to indicate the working position of the workpiece 6, thereby causing inconvenience to the user.

BRIEF SUMMARY OF THE INVENTION

In accordance with the present invention, there is provided a working machine, comprising a main frame, a work table mounted on the main frame for placing a workpiece, a plurality of working tools movably mounted in the main frame and movable to protrude outwardly from the work table to work the workpiece, and a distance adjustment device mounted on the main frame and movable relative to the workpiece to adjust a working position of the workpiece. The distance adjustment device includes two guide tacks mounted on two opposite sides of the work table respectively, two positioning members mounted on the two opposite sides of the work table respectively and each located between the work table and the respective guide track, and an adjustment unit adjustably mourned on the work table and detachably positioned on the positioning members.

The primary objective of the present invention is to provide a working machine having a distance adjustment function.

Another objective of the present invention is to provide a working machine which comprises an adjustment unit that can be used to adjust the position of the workpiece relative to the work table so as to adjust the working position and distance of the workpiece, thereby facilitating a user working the workpiece.

A further objective of the present invention is to provide a working machine, wherein the locking portion of each of the positioning rods is pushed by the respective elastic member and locked in the positioning holes of the respective positioning member closely, so that each of the fixing seats is fixed on the respective positioning member to position the transverse bracket and to fix the adjustment unit so as to adjust the working distance of the workpiece exactly.

A further objective of the present invention is to provide a working machine, wherein the adjustment unit is locked and unlocked by operation of one of the handles, so that the adjustment unit is operated easily and conveniently, thereby enhancing the working efficiency of the working machine.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
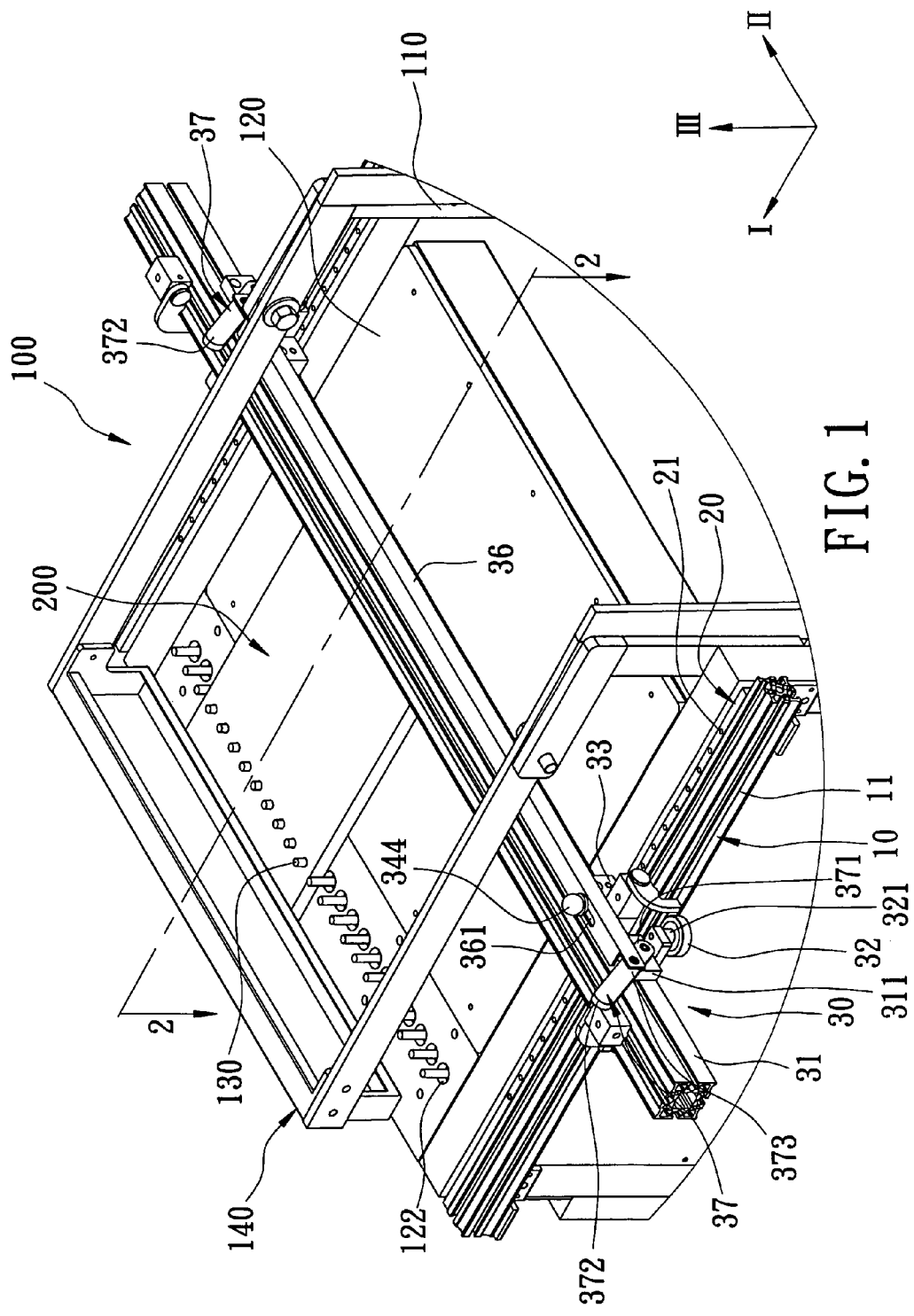
FIG. 1 is a partially perspective view of a working machine in accordance with the preferred embodiment of the present invention.

Referring to the drawings and initially to FIGS. 1-4, a working machine in accordance with the preferred embodiment of the present invention comprises a main frame 110, a work table 120 mounted on the main frame 110 for placing a workpiece 200, such as a wood material, a clamping unit 140 pivotally mounted on the main frame 110 and movable relative to the work table 120 to clamp or release the workpiece 200, a plurality of working tools 130 movably mounted in the main frame 110 and movable to protrude outwardly from the work table 120 to drill the workpiece 200, and a distance adjustment device 100 mounted on the main frame 110 and movable relative to the workpiece 200 to adjust a working position of the workpiece 200.

The work table 120 has a plurality of through holes 122 to allow passage of the working tools 130.

Figure 2:
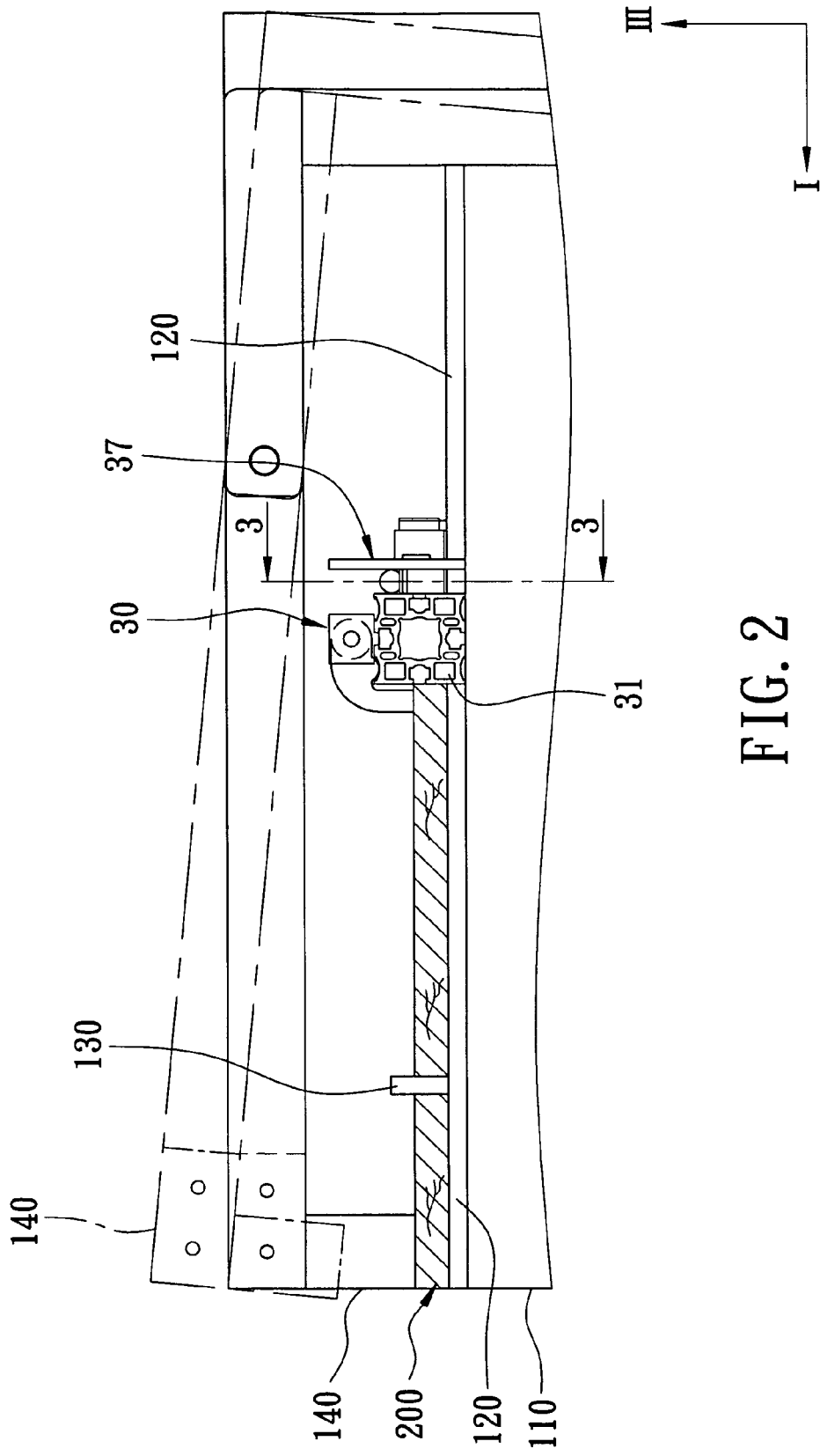
FIG. 2 is a plan cross-sectional view of the working machine taken along line 2-2 as shown in FIG. 1.

The clamping unit 140 is movable between a first position as shown in FIGS. 1 and 2 where the workpiece 200 is clamped by the clamping unit 140 and a second position as indicated by phantom lines shown in FIG. 2 where the workpiece 200 is released from the clamping unit 140.

The distance adjustment device 100 includes two guide tracks 10 mounted on two opposite sides of the work table 120 respectively, two positioning members 20 mounted on the two opposite sides of the work table 120 respectively and each located between the work table 120 and the respective guide track 10, and an adjustment unit 30 adjustably mounted on the work table 120 and detachably positioned on the positioning members 20.

Each of the guide tracks 10 extends in a first direction "I" and has an outer side formed with an axially arranged guide groove 11.

Each of the positioning members 20 is an elongated plate extending in the first direction "I" and has a plurality of axially arranged positioning holes 21. Each of the positioning holes 21 of each of the positioning members 20 is formed in a top face of each of the positioning members 20 and extends downward in a third direction "III" that is perpendicular to the first direction "I".

The adjustment unit 30 includes a transverse bracket 31 movably mounted on the guide tracks 10 and movable relative to the work table 120, two rollers 32 each rotatably mounted on the transverse bracket 31 and each movably mounted in the guide groove 11 of the respective guide track 10, two fixing seats 33 each secured on the transverse bracket 31 to move therewith and each movable relative to the respective positioning member 20, two positioning rods 34 each movably mounted on the respective fixing seat 33 in the third direction "III" and each detachably positioned on the respective positioning member 20, two elastic members 35 each mounted in the respective fixing seat 33 and each biased between the respective fixing seat 33 and the respective positioning rod 34 to push the respective positioning rod 34 toward the respective positioning member 20, a link 36 movably mounted on a side of the transverse bracket 31 and connected to the positioning rods 34 to move the positioning rods 34, and two handles 37 each pivotally mounted on the transverse bracket 31 and each pivotally connected with the link 36 to move the link 36.

The transverse bracket 31 extends in a second direction "II" that is perpendicular to the first direction "I" so that the transverse bracket 31 is perpendicular to the guide tracks 10. The transverse bracket 31 has two support blocks 311 provided on two opposite ends thereof. The workpiece 200 has a side rested on the transverse bracket 31.

Each of the rollers 32 is rotatably mounted on a bottom of the transverse bracket 31 by a shaft 321.

Each of the fixing seats 33 has an inside formed with a stepped slideway 331 to receive the respective positioning rod 34 and the respective elastic member 35. The slideway 331 of each of the fixing seats 33 has an upper portion formed with a first guide hole 332 and a lower portion formed with a second guide hole 333 having a diameter greater than that of the first guide hole 332.

Each of the positioning rods 34 is slidably mounted in the slideway 331 of the respective fixing seat 33 and has a first end formed with a reduced locking portion 341 protruded from the second guide hole 333 of the slideway 331 of the respective fixing seat 33 and detachably locked in one of the positioning holes 21 of the respective positioning member 20 and a second end formed with a mounting portion 342 protruded from the first guide hole 332 of the slideway 331 of the respective fixing seat 33 and the link 36. Each of the positioning rods 34 has a mediate portion formed with an enlarged shoulder 343 movably mounted in the second guide hole 333 of the slideway 331 of the respective fixing seat 33.

The adjustment unit 30 further includes two control knobs 344 each secured on the mounting portion 342 of the respective positioning rod 34 to move the respective positioning rod 34 and each rested on and driven by the link 36.

Each of the elastic members 35 is mounted on the respective positioning rod 34 and biased between a wall of the first guide hole 332 of the slideway 331 of the respective fixing seat 33 and the shoulder 343 of the respective positioning rod 34 to push the locking portion 341 of the respective positioning rod 34 toward the positioning holes 21 of the respective positioning member 20.

The link 36 is located between the respective fixing seat 33 and the respective control knob 344 and has two opposite ends each formed with an oblong slot 361 located under the respective control knob 344 to allow passage of the mounting portion 342 of the respective positioning rod 34.

Each of the handles 37 has a first end 371 pivotally mounted on the respective support block 311 of the transverse bracket 31, a mediate portion pivotally connected with the link 36 by a pivot shaft 373 and a second end formed with an operation portion 372.

As shown in FIGS. 1-4, the locking portion 341 of each of the positioning rods 34 is pushed by the respective elastic member 35 and locked in the positioning holes 21 of the respective positioning member 20, so that each of the fixing seats 33 is fixed on the respective positioning member 20 to position the transverse bracket 31 so as to fix the adjustment unit 30. At this time, each of the control knobs 344 is movable with the respective positioning rod 34 toward the link 36 by an elastic force of the respective elastic member 35 to press the link 36 toward the fixing seats 33, while each of the handles 37 is driven by the link 36 so that each of the handles 37 is located at an oblique state.

Figure 3:
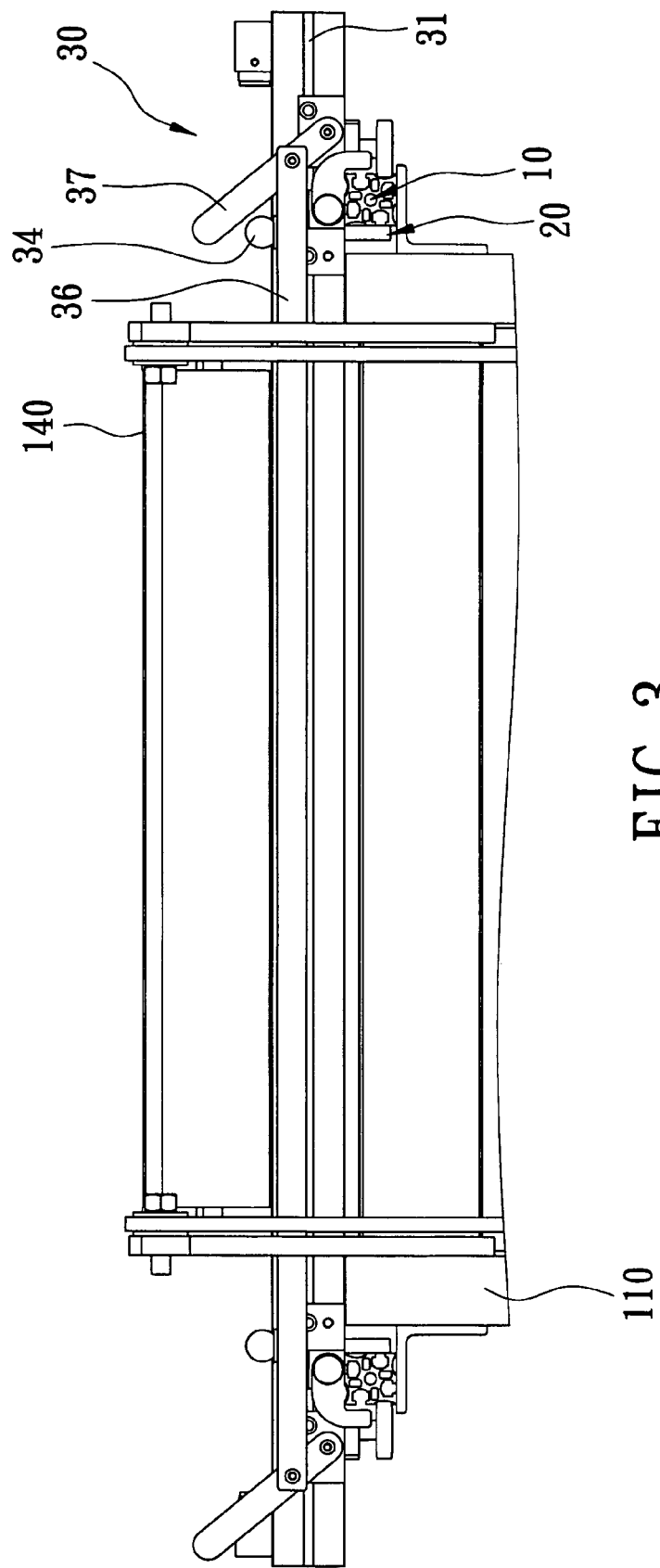
FIG. 3 is a plan cross-sectional view of the working machine taken along line 3-3 as shown in FIG. 2.
Figure 4:
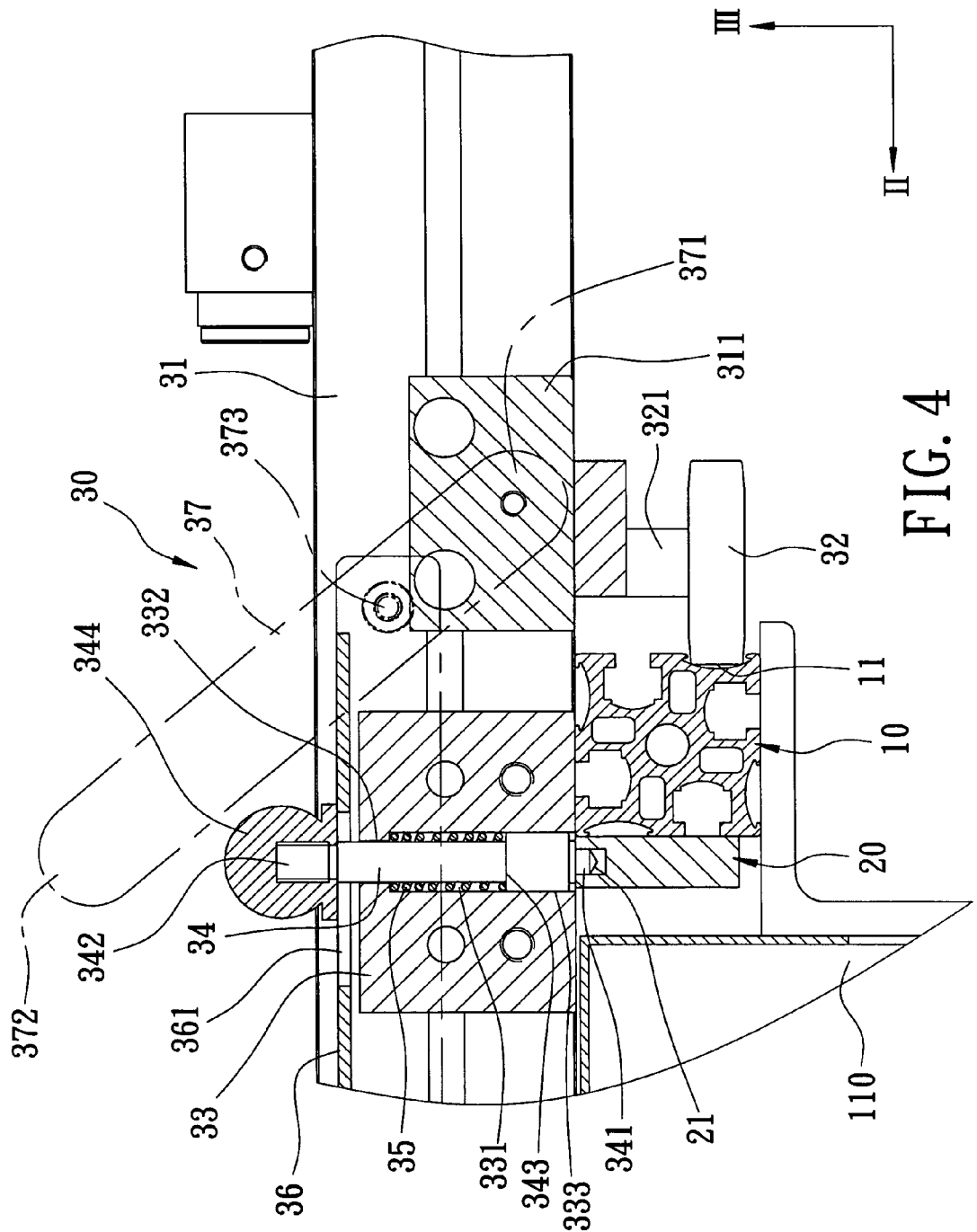
FIG. 4 is a locally enlarged plan cross-sectional view of the working machine as shown in FIG. 3.
Figure 5:
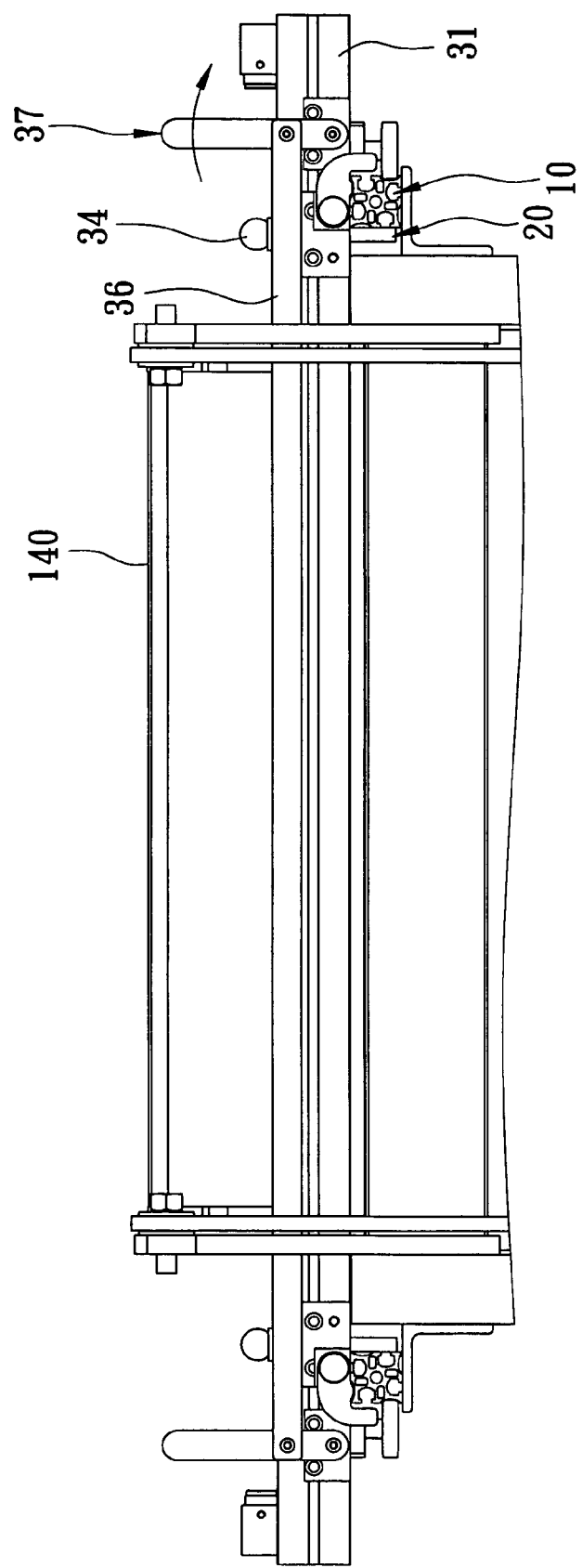
FIG. 5 is a schematic operational view of the working machine as shown in FIG. 3.
Figure 6:
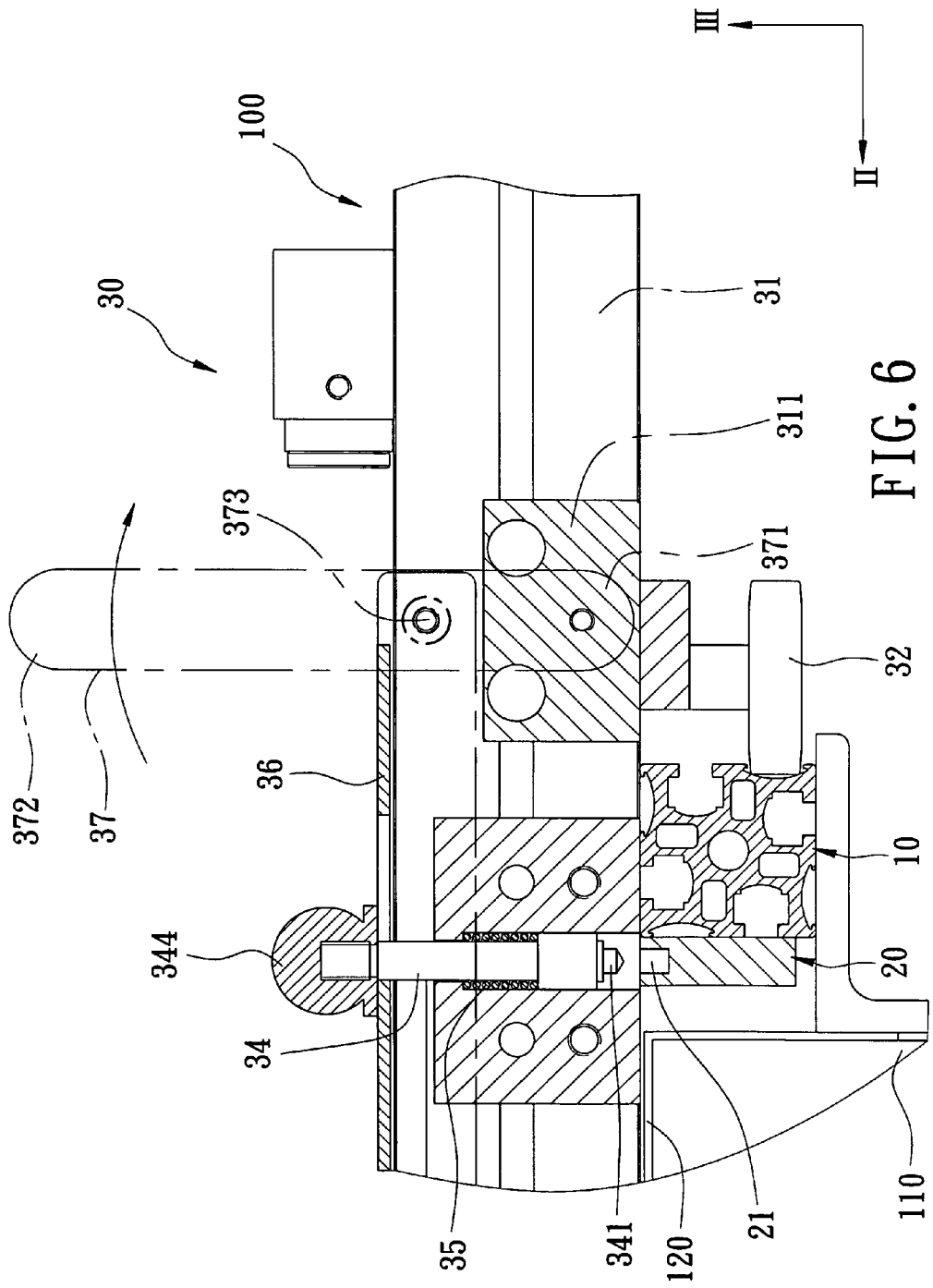
FIG. 6 is a schematic operational view of the working machine as shown in FIG. 4.
Figure 7:
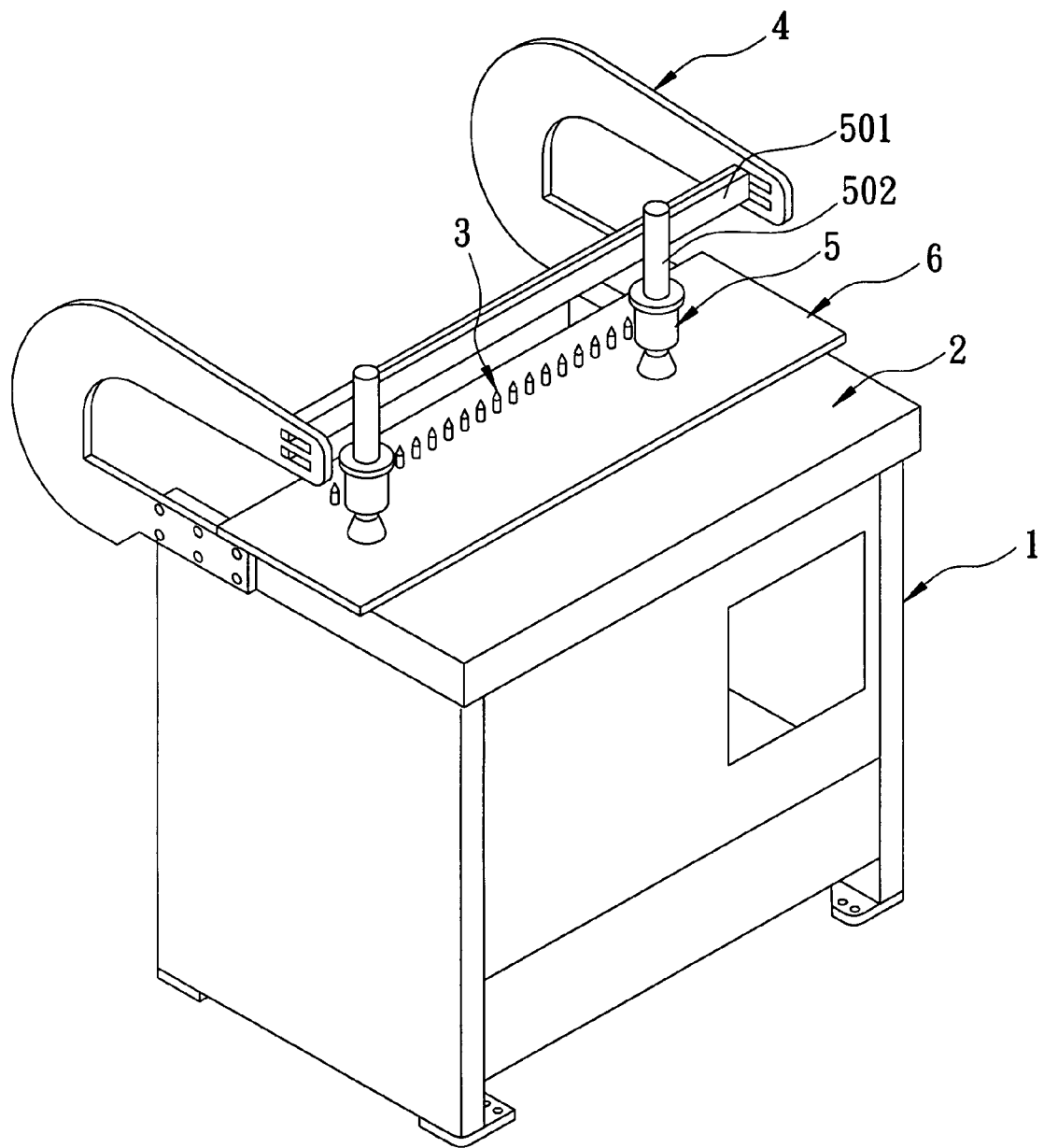
FIG. 7 is a perspective view of a conventional working machine in accordance with the prior art.

In operation, referring to FIGS. 1-6, when one of the handles 37 is driven in the third direction "III" and moved from the oblique state as shown in FIGS. 3 and 4 to the upright state as shown in FIGS. 5 and 6, the pivot shaft 373 is lifted by the respective handle 37 to move the link 36 upward, so that the link 36 is lifted to lift each of the control knobs 344 and to lift each of the positioning rods 34 so as to detach the locking portion 341 of each of the positioning rods 34 from one of the positioning holes 21 of the respective positioning member 20, thereby releasing each of the fixing seats 33 from the respective positioning member 20 so as to release the transverse bracket 31. Thus, the transverse bracket 31 is movable on the guide tracks 10 relative to the work table 120 so that the adjustment unit 30 is movable to push and adjust the position of the workpiece 200 relative to the work table 120 so as to adjust the working position and distance of the workpiece 200.

When the locking portion 341 of each of the positioning rods 34 aligns with another selective one of the positioning holes 21 of the respective positioning member 20, the force applied on one of the handles 37 is removed, so that the locking portion 341 of each of the positioning rods 34 is inserted into and locked in another selective one of the positioning holes 21 of the respective positioning member 20 by the restoring force of the respective elastic member 35 as shown in FIGS. 3 and 4. Thus, each of the fixing seats 33 is fixed on the respective positioning member 20 to position the transverse bracket 31 so as to fix the adjustment unit 30 again.

Accordingly, the working machine comprises an adjustment unit 30 that can be used to adjust the position of the workpiece 200 relative to the work table 120 so as to adjust the working position and distance of the workpiece 200, thereby facilitating a user working the workpiece 200. In addition, the locking portion 341 of each of the positioning rods 34 is pushed by the respective elastic member 35 and locked in the positioning holes 21 of the respective positioning member 20 closely, so that each of the fixing seats 33 is fixed on the respective positioning member 20 to position the transverse bracket 31 and to fix the adjustment unit 30 so as to adjust the working distance of the workpiece 200 exactly. Further, the adjustment unit 30 is locked and unlocked by operation of one of the handles 37, so that the adjustment unit 30 is operated easily and conveniently, thereby enhancing the working efficiency of the working machine.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A working machine, comprising:
a main frame;
a work table mounted on the main frame for placing a workpiece;

a plurality of working tools movably mounted in the main frame and movable to protrude outwardly from the work table to work the workpiece;

a distance adjustment device mounted on the main frame and movable relative to the workpiece to adjust a working position of the workpiece;

wherein, the distance adjustment device includes:

two guide tracks mounted on two opposite sides of the work table respectively;

two positioning members mounted on the two opposite sides of the work table respectively and each located between the work table and the respective guide track;

an adjustment unit adjustably mounted on the work table and detachably positioned on the positioning members;

wherein the adjustment unit includes:

a transverse bracket movably mounted on the guide tracks and movable relative to the work table;

two fixing seats each secured on the transverse bracket to move therewith and each movable relative to the respective positioning member;

two positioning rods each movably mounted on the respective fixing seat and each detachably positioned on the respective positioning member;

two elastic members each mounted in the respective fixing seat and each biased between the respective fixing seat and the respective positioning rod to push the respective positioning rod toward the respective positioning member;

a link movably mounted on a side of the transverse bracket and connected to the positioning rods to move the positioning rods; and two handles each pivotally mounted on the transverse bracket and each pivotally connected with the link to move the link.

2. The working machine in accordance with claim 1, wherein the transverse bracket is perpendicular to the guide tracks.

3. The working machine in accordance with claim 1, wherein the workpiece has a side rested on the transverse bracket.

4. The working machine in accordance with claim 1, wherein each of the fixing seats has an inside formed with a stepped slideway to receive the respective positioning rod and the respective elastic member.

5. The working machine in accordance with claim 4, wherein the slideway of each of the fixing seats has an upper portion formed with a first guide hole and a lower portion formed with a second guide hole having a diameter greater than that of the first guide hole.

6. The working machine in accordance with claim 4, wherein each of the positioning rods is slidably mounted in the slideway of the respective fixing seat.

7. The working machine in accordance with claim 5, wherein each of the positioning members has a plurality of axially arranged positioning holes, and each of the positioning rods has a first end formed with a reduced locking portion protruded from the second guide hole of the slideway of the respective fixing seat and detachably locked in one of the positioning holes of the respective positioning member and a second end formed with a mounting portion protruded from the first guide hole of the slideway of the respective fixing seat and the link.

8. The working machine in accordance with claim 7, wherein each of the positioning holes of each of the positioning members is formed in a top face of each of the positioning members.

9. The working machine in accordance with claim 7, wherein the adjustment unit further includes two control knobs each secured on the mounting portion of the respective positioning rod to move the respective positioning rod and each rested on and driven by the link.

10. The working machine in accordance with claim 7, wherein each of the positioning rods has a mediate portion formed with an enlarged shoulder movably mounted in the second guide hole of the slideway of the respective fixing seat, and each of the elastic members is mounted on the respective positioning rod and biased between a wall of the first guide hole of the slideway of the respective fixing seat and the shoulder of the respective positioning rod to push the locking portion of the respective positioning rod toward the positioning holes of the respective positioning member.

11. The working machine in accordance with claim 9, wherein the link is located between the respective fixing seat and the respective control knob.

12. The working machine in accordance with claim 9, wherein the link has two opposite ends each formed with an oblong slot located under the respective control knob to allow passage of the mounting portion of the respective positioning rod.

13. The working machine in accordance with claim 1, wherein the transverse bracket has two support blocks provided on two opposite ends thereof, and each of the handles has a first end pivotally mounted on the respective support block of the transverse bracket, a mediate portion pivotally connected with the link by a pivot shaft and a second end formed with an operation portion.

14. The working machine in accordance with claim 1, wherein the adjustment unit further includes two rollers each rotatably mounted on the transverse bracket.

15. The working machine in accordance with claim 14, wherein each of the guide tracks has an outer side formed with an axially arranged guide groove, and each of the rollers is movably mounted in the guide groove of the respective guide track.

16. The working machine in accordance with claim 14, wherein each of the rollers is rotatably mounted on a bottom of the transverse bracket by a shaft.

17. The working machine in accordance with claim 9, wherein each of the control knobs is movable with the respective positioning rod toward the link by an elastic force of the respective elastic member to press the link toward the fixing seats, and each of the handles is driven by the link so that each of the handles is located at an oblique state.

18. The working machine in accordance with claim 7, wherein each of the positioning members is an elongated plate extending in a first direction, the transverse bracket extends in a second direction that is perpendicular to the first direction, and each of the positioning holes of each of the positioning members extends downward in a third direction that is perpendicular to the first direction.

19. The working machine in accordance with claim 18, wherein each of the guide tracks extends in the first direction, and each of the positioning rods extends in the third direction.

* * * * *